United States Patent
Brendel et al.

(10) Patent No.: US 9,600,866 B2
(45) Date of Patent: Mar. 21, 2017

(54) PROJECTION DATA DE-NOISING

(71) Applicant: KONINKLIJKE PHILIPS N.V., Eindhoven (NL)

(72) Inventors: Bernhard Johannes Brendel, Norderstedt (DE); Gilad Shechter, Haifa (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/441,000

(22) PCT Filed: Nov. 7, 2013

(86) PCT No.: PCT/IB2013/059975
§ 371 (c)(1),
(2) Date: May 6, 2015

(87) PCT Pub. No.: WO2014/080311
PCT Pub. Date: May 30, 2014

(65) Prior Publication Data
US 2015/0279005 A1  Oct. 1, 2015

Related U.S. Application Data

(60) Provisional application No. 61/729,782, filed on Nov. 26, 2012.

(51) Int. Cl.
*G06K 9/00* (2006.01)
*G06T 5/00* (2006.01)
*G06T 11/00* (2006.01)

(52) U.S. Cl.
CPC ............ *G06T 5/002* (2013.01); *G06T 11/005* (2013.01); *G06K 9/00* (2013.01);
(Continued)

(58) Field of Classification Search
CPC ......... A61B 6/032; A61B 6/482; A61B 6/583; A61B 6/505; A61B 6/4085; A61B 6/4241;
(Continued)

(56) References Cited

U.S. PATENT DOCUMENTS 6,614,874 B2   9/2003  Avinash
6,987,833 B2   1/2006  Du et al.
(Continued)

FOREIGN PATENT DOCUMENTS

WO   2012123845 A1   9/2012

OTHER PUBLICATIONS

Alvarez, R. E., et al.; Energy-selective Reconstructions in X-ray Computerized Tomography; 1976; Phys. Med. Biol.; 21(5)733-744.
(Continued)

*Primary Examiner* — Vu Le
*Assistant Examiner* — Aklilu Woldemariam

(57) ABSTRACT

This application describes an approach to filter, solely in the projection domain, correlated noise from (or de-noise) spectral/multi-energy projection data. As described herein, this can be achieved based at least on variances of the basis material line integrals and a covariance there between, based on multiple correlation coefficients and hyper-planes that describe the noise correlation between different basis material line integrals, and/or otherwise.

21 Claims, 5 Drawing Sheets

(52) U.S. Cl.
CPC ............... *G06T 2207/10072* (2013.01); *G06T 2207/10116* (2013.01); *G06T 2207/30004* (2013.01)

(58) Field of Classification Search
CPC ..... A61B 6/5258; A61B 6/4275; A61B 6/563; A61B 6/4042; A61B 6/037; A61B 6/481; A61B 6/03; A61B 5/444; A61B 5/445; A61B 5/7246; A61B 5/7425; A61B 5/7485; A61B 8/13; A61B 6/585; A61B 6/405; G06T 2207/20028; G06T 5/002; G06T 11/005; G06T 2207/10072; G06T 2207/10116; G06T 2207/10081; G06T 5/20; G06T 2207/30004; G06T 5/10; G06T 2211/408; G06T 2211/421; G06T 7/0012; G06T 11/003; G06T 2211/416; G06T 7/0002; G06T 7/408; G06T 11/008; G06K 9/00516; G06K 9/40; G06K 9/6857; Y10S 378/901; G21K 1/10; G01N 23/046; G01N 2223/419; G01T 7/005; G01T 1/36; G01S 15/8981; G06F 19/345; G01V 5/0008; H04B 1/1638
USPC ....... 382/131, 130, 129, 128, 132, 195, 203; 600/407, 431, 425
See application file for complete search history.

(56) References Cited

U.S. PATENT DOCUMENTS

| | | | |
|---|---|---|---|
| 7,697,657 B2 * | 4/2010 | Walter | A61B 6/4241 378/4 |
| 7,801,264 B2 | 9/2010 | Wu et al. | |
| 2004/0264626 A1 * | 12/2004 | Besson | A61B 6/508 378/4 |
| 2008/0135789 A1 | 6/2008 | Du et al. | |
| 2008/0226017 A1 * | 9/2008 | Altman | G06T 7/0004 378/4 |
| 2008/0253504 A1 * | 10/2008 | Proksa | A61B 6/032 378/5 |
| 2009/0161814 A1 | 6/2009 | Wu et al. | |
| 2009/0214095 A1 * | 8/2009 | Wu | G06T 5/002 382/131 |
| 2012/0039440 A1 * | 2/2012 | Fan | A61B 6/032 378/62 |
| 2012/0045109 A1 * | 2/2012 | Proksa | A61B 6/032 382/131 |
| 2012/0076258 A1 * | 3/2012 | Chandra | A61B 6/03 378/5 |
| 2013/0202178 A1 * | 8/2013 | Shechter | A61B 6/032 382/131 |
| 2013/0266115 A1 * | 10/2013 | Fan | A61B 6/06 378/16 |
| 2013/0343624 A1 * | 12/2013 | Thibault | G06T 11/006 382/131 |
| 2014/0005971 A1 * | 1/2014 | Roessl | G06T 11/005 702/104 |
| 2014/0056503 A1 * | 2/2014 | Shechter | G06T 7/0012 382/131 |
| 2014/0112565 A1 * | 4/2014 | Roessl | G01N 23/046 382/131 |
| 2014/0133729 A1 * | 5/2014 | Goshen | G06T 5/002 382/131 |
| 2014/0185901 A1 * | 7/2014 | Edic | G06T 11/003 382/132 |
| 2014/0348440 A1 * | 11/2014 | Bergner | G06T 11/006 382/254 |
| 2015/0182176 A1 * | 7/2015 | Jin | A61B 6/4241 378/5 |
| 2015/0279005 A1 * | 10/2015 | Brendel | G06T 5/002 382/131 |
| 2016/0106386 A1 * | 4/2016 | Fan | A61B 6/482 378/5 |

OTHER PUBLICATIONS

Kalender, W. A., et al.; An Algorithm for Noise Suppression in Dual Energy CT Material Density Images; 1988; IEEE Trans. on Medical Imaging; 7(3)218-224.

Roessl, E., et al.; K-edge imaging in x-ray computed tomography using multi-bin photon counting detectors; 2007; Phys. Med. Biol.; 52:4679-4696.

Schlomka, J. P., et al.; Experimental feasibility of multi-energy photon-counting K-edge imaging in pre-clinical computed tomography; 2008; Phys. Med. Biol.; 53:4031-4047.

Tkaczyk, J. E., et al.; Quantization of liver tissue in dual kVp computed tomography using linear discriminant analysis; 2009; Proc. of SPIE; 7258:72580G1-72580G12.

* cited by examiner

PROJECTION DATA DE-NOISING

CROSS REFERENCE TO RELATED APPLICATIONS

This application is a national filing of PCT application Serial No. PCT/IB2013/059975, filed Nov. 7, 2013, published as WO 2014/080311 A1 on May 30, 2014, which claims the benefit of U.S. provisional application Ser. No. 61/729,782 filed Nov. 26, 2012, which is incorporated herein by reference.

The following generally relates to projection data de-noising and is described with particular application to spectral/multi-energy computed tomography (CT). However, the following is also amenable to other imaging modalities such as a spectral/multi-energy digital x-ray and/or other spectral/multi-energy imaging.

A CT scanner includes an x-ray tube that emits radiation that traverses an examination region and an object therein. A detector array located opposite the examination region across from the x-ray tube detects radiation that traverses the examination region and the object therein and generates projection data indicative of the examination region and the object therein. A reconstructor processes the projection data and reconstructs volumetric image data indicative of the examination region and the object therein.

In spectral/multi-energy CT, multiple projection data sets are acquired, which represent the attenuation properties of the scanned object for different X-ray spectra. Based on these data sets, physical object properties can be determined locally (e.g., photo effect, Compton scattering, water content, bone content, iodine content, etc.). The determination of these properties is called material decomposition. Two possible approaches for the material decomposition are the decomposition in image domain and the decomposition in projection domain.

For image domain decomposition, an image is reconstructed for each acquired projection data set, and the material decomposition is performed on the reconstructed images, converting the reconstructed voxel values for one image location into material values. However, this approach tends to lead to image artifacts and biased material concentration values caused due to the beam hardening effect. For projection domain decomposition, the material decomposition is performed by converting the "measured line integrals" for each ray into "basis material line integrals." The basis material line integrals are then reconstructed to generate basis material images.

However, as a consequence of projection domain decomposition, the noise of the measured projection data might be strongly magnified. For the special case of only two basis materials, this magnified noise is highly negatively-correlated for the two different basis material line integrals of one acquisition ray. The increase of this correlated noise depends on the total attenuation along the given ray, and can therefore be enhanced in specific locations of the sinogram of all ray paths.

This is demonstrated in Tkaczyk et al., "Quantization of liver tissue in Dual kVp computed tomography using linear discriminant analysis," Proc. of SPIE, 7258, pp 72580G1-72580G 12, (2009), which shows that using two monochromatic spectra, when the energy dependence of the basis material attenuation profiles becomes similar or when the energy separation between the used spectra becomes small, the noise of the basis material line integrals of the same ray path can strongly increase and negatively correlate. The same phenomenon occurs for multi-energy polychromatic spectra.

Unfortunately, the negatively-correlated noise can lead to streak artifacts in the reconstructed images. As a result, if images are directly reconstructed from the basis material line integrals, the basis material images can be noisy due to the noise amplification, which may reduce the clinical and/or diagnostic value of the basis material images. The correlated noise may also propagate to monochromatic images and reduce the spectral information contrast to noise ratio (CNR) for spectral applications.

Aspects described herein address the above-referenced problems and others.

This application describes an approach to filter, solely in the projection domain, correlated noise from (or de-noise) spectral/multi-energy projection data. As described herein, this can be achieved based on the covariance matrix between different basis material line integrals noise components and/or based on multiple correlation coefficients and hyper-planes that describe the noise correlation between different basis material line integrals.

In one aspect, a method includes receiving spectral/multi-energy projection data, including at least two sub-sets of measured line integrals, each sub-set representing attenuation properties of a scanned object for different X-ray spectra, decomposing the spectral/multi-energy projection data into a plurality of basis material line integrals, and de-noising, solely in the projection domain, the plurality of basis material line integrals by removing correlated noise from the plurality of basis material line integrals, generating de-noised decomposed basis material line integrals.

In another aspect, a projection data processor includes a projection data de-noiser that receives at least a plurality of basis material line integrals corresponding to at least two different basis materials and that de-noises, solely in the projection domain, the plurality of basis material line integrals by removing correlated noise from the plurality of basis material line integrals, generating de-noised decomposed basis material line integrals.

In another aspect, computer readable instructions are encoded on computer readable storage medium, which, when executed by a processor of a computing system, cause the processor to: de-noise, solely in the projection domain, a plurality of basis material line integrals by removing correlated noise from the plurality of basis material line integrals, generating de-noised decomposed basis material line integrals, wherein the de-noising is based on at least one of a covariance matrix between different basis material line integrals noise components or multiple correlation coefficients and hyper-planes that describe a noise correlation between the different basis material line integrals.

The invention may take form in various components and arrangements of components, and in various steps and arrangements of steps. The drawings are only for purposes of illustrating the preferred embodiments and are not to be construed as limiting the invention.

FIG. 1 schematically illustrates a projection data processor in connection with an imaging system.

FIG. 2 schematically illustrates a non-limiting example of the projection data de-noiser of FIG. 1.

FIG. 3 schematically illustrates another non-limiting example of the projection data de-noiser of FIG. 1.

Figure 1:
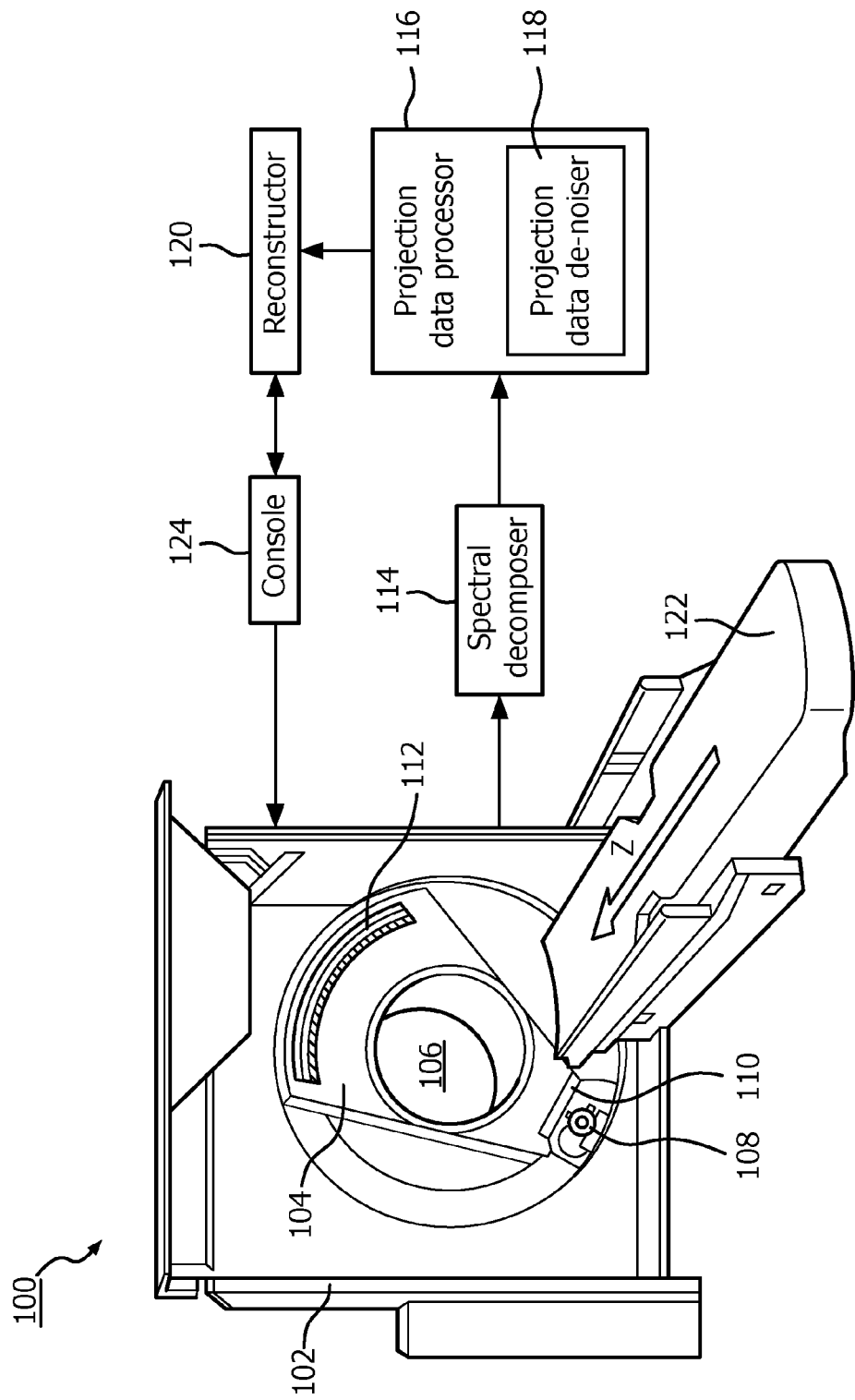

Initially referring to FIG. 1, an imaging system 100, such as a computed tomography (CT) scanner, is schematically illustrated. The imaging system 100 includes a generally stationary gantry 102 and a rotating gantry 104. The rotating gantry 104 is rotatably supported by the stationary gantry 102 and rotates around an examination region 106 about a longitudinal or z-axis.

A radiation source 108, such as an x-ray tube, is rotatably supported by the rotating gantry 104. The radiation source 108 rotates with the rotating gantry 104 and emits radiation that traverses the examination region 106. A source collimator 110 includes collimation members that collimate the radiation to form a generally cone, wedge, fan or other shaped radiation beam.

A radiation sensitive detector array 112 subtends an angular arc opposite the radiation source 110 across the examination region 106. The detector array 112 includes one or more rows of detectors that extend along the z-axis direction. The detector array 112 detects radiation traversing the examination region 106 and generates projection data (or measured line integrals) indicative thereof.

In the illustrated example, the projection data is spectral/multi-energy projection data. As used herein, spectral/multi-energy projection data is projection data that includes at least two sub-sets of projection data, each representing attenuation properties of the scanned object for different X-ray spectra. Such projection data can be obtained where the detector array includes a photon counting detector and/or a multi-layer spectral detector, and/or the source 108 includes multiple sources that emit different energy spectrums and/or is configured to switch between at least two different energy spectrums during a scan.

A spectral decomposer 114 decomposes the acquired spectral/multi-energy projection data, producing decomposed spectral/multi-energy projection data, or basis material line integrals. The decomposition can be based on two or more basis materials such as the photoelectric effect, Compton scattering, water content, bone content, iodine content, a k-edge, and/or other basis material.

A projection data processor 116 processes the decomposed spectral/multi-energy projection data. The illustrated projection data processor 116 includes a projection data de-noiser 118. As described in greater detail below, the projection data de-noiser 118 at least filters correlated noise from the decomposed spectral/multi-energy projection data. In one instance, this includes filtering the correlated noise using a statistical model based correlation filter. With this approach, correlated noise is reduced while keeping object structures widely unaffected.

In another instance, this includes using multiple correlation coefficients and hyper-planes that describe the noise correlation between decomposed projection data of different basis materials. In this instance, the de-noising reduces patterned and/or non-patterned image noise in the reconstructed basis material images and/or has little to no impact on spatial resolution, and spectral CT applications like quantitative iodine maps, material separation images and monochromatic images are improved in terms of improved contrast to noise ratio (CNR) and/or noise image streaks suppression.

A reconstructor 120 reconstructs the de-noised decomposed projection data and generates volumetric image data indicative thereof. The reconstructor 120 may employ a conventional 3D filtered-backprojection reconstruction, a cone beam algorithm, an iterative algorithm and/or other algorithm.

A patient support 122, such as a couch, supports an object or subject such as a human patient in the examination region 106.

A general-purpose computing system or computer serves as an operator console 124, which allows an operator to control an operation of the system 100, such as selecting and/or activating at least a projection domain de-noising algorithm.

In the illustrated embodiment, the projection data processor 116 is separate from the console 124. In this instance, the projection data processor 116 can be part of a computing system such as a dedicated computer and/or other computing system. In a variation, the projection data processor 116 is part of the console 124.

In either instance, the projection data processor 116 can be implemented via a processor (e.g., a microprocessor, a central processing unit or CPU, or the like) executing computer readable instructions stored on computer readable storage medium such as physical memory or other non-transitory memory. The processor can alternatively or additionally execute instructions carried by a carrier wave, signal or other transitory medium.

Figure 2:
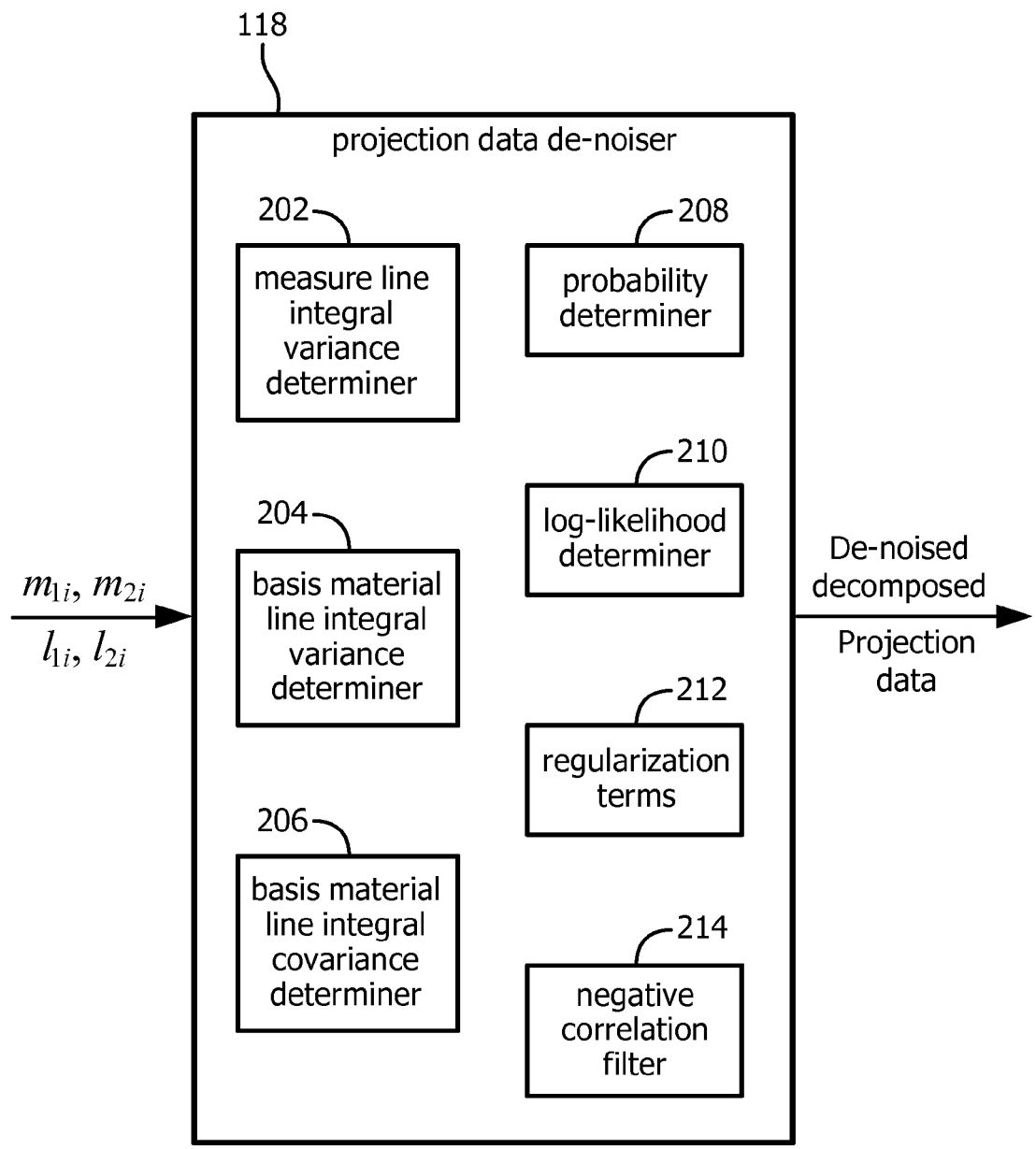

FIG. 2 illustrates an example of the projection data de-noiser 118.

For sake of brevity and clarity, the following is discussed in connection with two sub-sets of spectral/multi-energy projection data. However, it is to be understood that the following can be extended to more than two sub-sets of spectral/multi-energy projection data.

The projection data de-noiser 118 receives as input the measured line integrals $l_{1i}$ and $l_{2i}$, and the decomposed or basis material line integrals $m_{1i}$ and $m_{2i}$, which were decomposed from the measured line integrals by the spectral decomposer 114 (FIG. 1) or other component, for example, respectively using functions $m_{1i}(l_{1i},l_{2i})$ and $m_{2i}(l_{1i},l_{2i})$. In the above, i is an acquired ray index.

A measured line integral variance determiner 202 processes the measured line integrals $l_{1i}$ and $l_{2i}$, and generates respective measured line integral variances $var(l_{1i})$ and $var(l_{2i})$. Where the measured line integral variances $var(l_{1i})$ and $var(l_{2i})$ are provided to the projection data de-noiser 118 as in input, the projection data processor 116 can be omitted.

A basis material variance determiner 204 processes the measured line integrals $l_{1i}$ and $l_{2i}$, the basis material line integrals $m_{1i}$ and $m_{2i}$, and the measured line integral variances $var(l_{1i})$ and $var(l_{2i})$, and generates respective basis material line integral variances $var(m_{1i})$ and $var(m_{2i})$. This can be achieved as shown in EQUATIONS 1 and 2:

$$var(m_{1i}) = \left(\frac{\partial m_{1i}}{\partial l_{1i}}\right)^2 \cdot var(l_{1i}) + \left(\frac{\partial m_{1i}}{\partial l_{2i}}\right)^2 \cdot var(l_{2i}) \quad \text{EQUATION 1}$$

and $$var(m_{2i}) = \left(\frac{\partial m_{2i}}{\partial l_{1i}}\right)^2 \cdot var(l_{1i}) + \left(\frac{\partial m_{2i}}{\partial l_{2i}}\right)^2 \cdot var(l_{2i}). \quad \text{EQUATION 2}$$

A basis material covariance determiner 206 determines a covariance $cov(m_{1i},m_{2i})$ between the basis material line integrals $m_{1i}$ and $m_{2i}$, based on the measured line integrals $l_{1i}$ and $l_{2i}$, the basis material line integrals $m_{1i}$ and $m_{2i}$, and the measured line integral variances $var(l_{1i})$ and $var(l_{2i})$. This can be achieved as shown in EQUATION 3:

$$cov(m_{1i}, m_{2i}) = \frac{\partial m_{1i}}{\partial l_{1i}}\frac{\partial m_{2i}}{\partial l_{1i}} \cdot var(l_{1i}) + \frac{\partial m_{1i}}{\partial l_{2i}}\frac{\partial m_{2i}}{\partial l_{2i}} \cdot var(l_{2i}). \quad \text{EQUATION 3}$$

A probability determiner 208 determines a probability $p(m_i)$ that a pair of basis material line integrals $m_{1i}$, $m_{2i}$ belongs to a "true" pair of basis material line integrals $\bar{m}_{1i}$, $\bar{m}_{2i}$. This can be achieved as shown in EQUATION 4:

$$p(m_i) \propto \exp\left(-\frac{1}{2}(m_i - \bar{m}_i)^T C_i^{-1}(m_i - \bar{m}_i)\right), \quad \text{EQUATION 4}$$

where $$m_i = (m_{1i} m_{1i})^T, \bar{m}_i = (\bar{m}_{1i} \bar{m}_{1i})^T, \text{ and}$$

$$C_i = \begin{pmatrix} \text{var}(m_{1i}) & \text{cov}(m_{1i}, m_{2i}) \\ \text{cov}(m_{1i}, m_{2i}) & \text{var}(m_{2i}) \end{pmatrix}.$$

A log-likelihood determiner 210 determines, based on the probability (and, in one instance, assuming little to no correlation of noise between different acquisition rays, i.e. between different indices i), a log-likelihood for a complete set of basis material line integrals. This can be achieved as shown in EQUATION 5:

$$L \equiv -\frac{1}{2} \sum_i (m_i - \bar{m}_i)^T C_i^{-1}(m_i - \bar{m}_i),$$

where "≡" means "equal up to irrelevant constants." The log-likelihood determiner 210 can extend L via regularization terms 212 representing a priori information about the "true" set of material line integrals. This is shown in EQUATION 6:

$$\hat{L} \equiv L - \beta_1 \sum_i \sum_k w_{ik} \psi(\bar{m}_{1i} - \bar{m}_{1k}) - \quad \text{EQUATION 6}$$

$$\beta_2 \sum_i \sum_k w_{ik} \psi(\bar{m}_{2i} - \bar{m}_{2k}).$$

where L represents an un-regularized log-likelihood and the second and third terms represent regularizations for each basis material.

These regularizations are smoothing functions with a potential function ψ, which evaluates, for each measured ray i, a difference of the basis material line integral value to the values of a number of neighboring rays k, and $w_{ik}$ are weighting parameters, which, in one instance, are set equal to an inverse distance between the basis material line integrals, such that a larger distance leads to a lower weight. Regularization parameters $\beta_1$ and $\beta_2$ that adjust regularization strength are free parameters.

It is to be understood that other regularization terms are also contemplated herein. For example, other suitable regularization terms include, but are not limited to: $\beta_1 R_1 + \beta_2 R_2$, $\sqrt{\beta_1^2 R_1^2 + \beta_2^2 R_2^2}$, $\beta\sqrt{R_1^2 + R_2^2}$, where $R_1$ and $R_2$ are the regularization for the basis materials. For the last example, the parameter β can be chosen to either remove only part of the noise but keep the spatial resolution in the projection data (small value for β) or to remove the noise nearly completely but lose some resolution in the projection data (large value for β). Any compromise between these two extreme scenarios is possible by varying β. Generally, β can be pre-determined, user defined, and/or adjustable.

In clinical practice, the value of β will depend on the application. Since the loss of spatial resolution in the projection data for large values of β will lead to loss of spatial resolution of the reconstructed image, large values will mainly be used if a strong noise removal is needed or if a loss of spatial resolution in the image is acceptable. In one instance, available values of β will be predetermined and presented to a user for selection, for example, as soft buttons and/or key board commands to select low, medium or high smoothing.

A correlation filter 214 performs correlation filtering by maximizing the log-likelihood L or the extended log-likelihood $\hat{L}$. By way of non-limiting example, with simulated photon-counting data for two energy bins combined with a decomposition in photoelectric effect and Compton scattering and a Huber-penalty for the regularization of both, photoelectric effect and Compton scattering, the data can be de-noised to remove correlated noise.

The projection data de-noiser 118 outputs the de-noised decomposed spectral/multi-energy projection data or basis material line integrals, which can be reconstructed by the reconstructor 120 to produce basis material images and/or a conventional (non-spectral) image. An image quality of the corresponding reconstructed image can be improved relative to an image quality of image reconstructed image without such filtering, or from the unfiltered measured line integrals.

Figure 3:
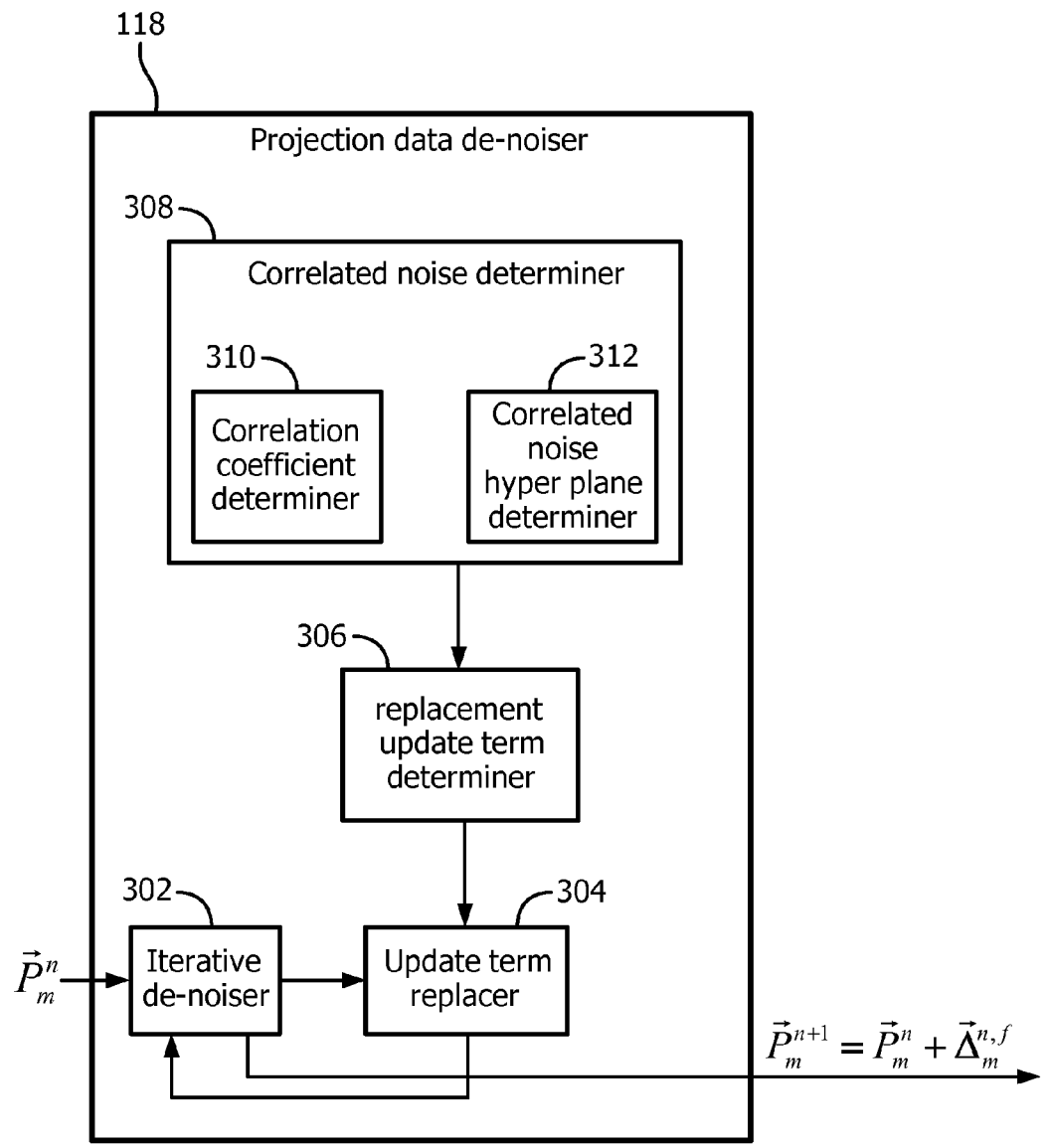

FIG. 3 illustrates another example of the projection data de-noiser 118.

In this example, the projection data de-noiser 118 includes an iterative de-noiser 302 that iteratively de-noises basis material line integrals $\{\vec{P}_m^n\}$ of basis materials $m \in 1:M$ where M is the number of basis materials, (where n in an iteration cycle index) by applying an iterative de-noising algorithm such as maximization of the regularized log likelihood shown in EQUATIONS 5 or 6, or total variation minimization, bilateral filtering and/or other de-noising algorithm, generating de-noised basis material line integrals $\{\vec{P}_m^{n+1}\}_{m \in 1:M} = \{\vec{P}_m^n\}_{m \in 1:M} + \{\vec{\Delta}_m^n\}_{m \in 1:M}$, with an update term $\{\vec{\Delta}_m^n\}_{m \in 1:M}$.

An update term replacer 304 replaces the update terms $\{\vec{\Delta}_m^n\}_{m \in 1:M}$ with a replacement update term $\{\vec{\Delta}_m^{n,f}\}_{m \in 1:M}$, each iteration, rendering $\{\vec{P}_m^{n+1}\}_{m \in 1:M} = \{\vec{P}_m^n\}_{m \in 1:M} + \{\vec{\Delta}_m^{n,f}\}_{m \in 1:M}$; generally, the replacement update term $\{\vec{\Delta}_m^{n,f}\}_{m \in 1:M}$ filters, from the de-noising process, update layers that do not correspond to a pre-determined correlated noise. A replacement update term determiner 306 determines the replacement update term $\{\vec{\Delta}_m^{n,f}\}_{m \in 1:M}$, as describe in greater detail below.

A correlated noise determiner 308 determines the pre-determined correlated noise. The correlated noise determiner 308 includes a correlation coefficient determiner 310 and a correlated noise hyper plane determiner 312. The correlation coefficients and hyper planes are calculated as described in the following based on the estimated covariance matrix C (EQUATION 4). Estimating the covariance matrix is possible by different ways, for example, by the noise propagation described in EQUATIONS 1-3. Another way to estimate the covariance matrix is by "sample noise" as described next. According to the "sample noise" method, for each ray r belonging to a set of line integrals, a 3D neighborhood, for example, of an ellipsoidal shape concentric with this ray, is defined. Noise components of the readings within this neighborhood are then determined separately and independently for the M decomposed line integrals.

A non-limiting approach of the above includes calculating, separately for each of the M decomposed line integrals, a local 3D fit for the readings in the neighborhood of the given ray, for example, by a second order polynomial. Then, addressing this fit as a noiseless signal estimation within this neighborhood, a noise of each of the readings in this neighborhood is determined by omitting this fit from the original readings in this neighborhood.

The estimated noise components are referred to herein by a column vector $\vec{p}_{m\in(1:M)}^{i}$. A length of the vector $\vec{p}_{m\in(1:M)}^{i}$ is equal to a number of rays in the neighborhood, denoted by K. A geometrical ordering of all $\vec{p}_{m\in(1:M)}^{i}$ is kept the same. In other words, for any $1 \leq k \leq K$, the noise components $\vec{p}_1^i(k), \vec{p}_2^i(k), \ldots \vec{p}_M^i(k)$ correspond to the same neighbor ray of the ray i. Using the "sample noise" method, the estimated covariance matrix is obtained as follows in EQUATION 7, where "·" represents inner product multiplication, and the superscript "i" represents the ray:

$$C_{m,m'}^{i} = (\vec{p}_m^i \cdot \vec{p}_{m'}^i)/K \quad \forall m,m' \in (1:M). \qquad \text{EQUATION 7}$$

Next, in the framework of multiple regression analysis, for each basis material m, a best predictor to $p_m^i$ denoted by $\hat{p}_m^i$ (that is regarded as a dependent parameter) is determined based on independent parameters $\{p_{m' \neq m}^i\}$.

The predictor $\hat{p}_m^i$ can be determined based on the covariance matrix as in EQUATION 8:

$$\hat{p}_m^i = \frac{-1}{(C^{-1})_{m,m}^i} \cdot \sum_{m' \neq m} (C^{-1})_{m',m}^i \cdot p_{m'}^i. \qquad \text{EQUATION 8}$$

The predictor expression in EQUATION 8 derived from the covariance matrix is identical to the expression for that predictor obtained by linear regression, as shown in EQUATION 9:

$$\hat{\vec{p}}_m^i = \vec{x}^i * \vec{\beta}_m^i; \ \vec{x}^i = [\vec{p}_1^i, \vec{p}_2^i, \ldots \vec{p}_{m-1}^i, \vec{p}_{m+1}^i,$$
$$\vec{p}_{m+2}^i, \ldots, \vec{p}_M^i], \ \vec{\beta}_m^i = (\vec{x}^{iT} * \vec{x}^i)^{-1} * \vec{x}^{iT} * \vec{p}_m^i, \qquad \text{EQUATION 9}$$

where, $\vec{p}_m^i \forall m \in (1:M)$ is a vector of length $q \to \infty$ representing the noise component of the basis material m within a countable set of q noise realizations of correlated noise components of the ray, "*" represents matrix multiplication, a superscript T represents a transposed operation.

The correlation coefficient determiner 310 determines a statistical correlation $ccs_m^r$ between a noise component of one of the basis material line integrals $p_m^i$ and noise components of all the other basis material line integrals corresponding to a same ray. The correlation coefficient $ccs_m^i$ between the noise component of the reading of the ray i in the sinogram m, denoted by $p_m^i$, and between the predictor $\hat{p}_m^i$ can be defined as shown in EQUATION 10:

$$ccs_m^i \equiv \frac{(E(\hat{p}_m^i \cdot p_m^i))^2}{E((\hat{p}_m^i)^2) \cdot E((p_m^i)^2)} \subset [01]. \qquad \text{EQUATION 10}$$

Substituting $\hat{p}_m^i$ from EQUATION 8 into EQUATION 10, renders EQUATION 11:

$$ccs_m^i = \frac{\left(\sum_{m' \neq m}(C^{-1})_{m',m} \cdot C_{m',m}\right)^2}{C_{m,m} \cdot \sum_{m',m'' \neq m}(C^{-1})_{m',m} \cdot (C^{-1})_{m'',m} \cdot C_{m',m''}} \subset [01]. \qquad \text{EQUATION 11}$$

The correlated noise hyper plane determiner 312 determines based on the predictor $\hat{p}_m^i$ a hyper plane involving different noise components obtained for the reading of ray i of the basis material line integrals for basis material m as shown in EQUATION 12:

$$\sum_{i \in 1:M}(C^{-1})_{m',m}^i(C^{-1})_{m,m}^i \cdot p_{m'}^i = (C^{-1})_{m,m}^i \cdot (p_m^i - \hat{p}_m^i) = 0. \qquad \text{EQUATION 12}$$

Equation 12 describes a correlation between noise component $p_m^r$ of the reading corresponding to the ray r and the basis material m and counterparts in the remaining M−1 sets of basis material line integrals.

The hyper-plane calculated for the basis material m noise component given in EQUATION 12 is identical to the hyper-plane definition obtained by linear regression as shown in EQUATION 13.

$$[p_m^i, p_1^i, p_2^i, \ldots p_{m-1}^i, p_{m+1}^i, p_{m+2}^i, \ldots p_M^i] * \begin{bmatrix} -1 \\ \vec{\beta}_m^i \end{bmatrix} = 0. \qquad \text{EQUATION 13}$$

In the case of dual energy, where the noise of the decomposed scatter and photoelectric readings is negatively correlated, the correlated noise hyper plane determiner 312 filters out updates $\vec{\Delta}_m^n$ for rays for which $\text{sign}(\Delta_{m=1}^{n,r}) = \text{sign}(\Delta_{m=2}^{r,n})$.

The update term replacer 304 calculates $\{\vec{\Delta}_m^{n,f}\}_{m \in 1:M}$ based on $\{\vec{\Delta}_m^n\}_{m \in 1:M}$. By way of non-limiting example, where values of $\{\vec{\Delta}_m^n\}_{m \in 1:M}$ for the ray i are denoted by the column vector of length M $\vec{\Delta}_i^n$, the replacement update term determiner 306 replaces this vector with $\vec{\Delta}_i^{n,mod\ 1}$, taking into account the pre-calculated coefficient $ccs_m^i$, as shown in EQUATION 14:

$$\vec{\Delta}_i^{n,mod\ 1}(m) = \vec{\Delta}_i^n(m) \cdot ccs_m^i \forall 1 \leq m \leq M. \qquad \text{EQUATION 14}$$

Using EQUATION 14, noise components not identified as correlated noise are filtered. The noise components belonging to the readings of the ray i that do not behave with respect to each other according to the hyper-planes defined separately for each basis material noise component of the ray in EQUATIONS 12 and 13 are also filtered. For this, Lagrange multipliers or the like are used, and, for each m, separately, projects the vector $\vec{\Delta}_i^{n,mod\ 1}$ on the hyper plane defined by EQUATION 12 for the basis material m, denoted as projected vector $\vec{\Delta}_{i,m}^{n,p}$, and a new vector $\vec{\Delta}_i^{n,mod\ 2}$ of length M is defined based on EQUATION 15:

$$\vec{\Delta}_i^{n,mod\ 2}(m) = \vec{\Delta}_{i,m}^{n,p}(m) \forall 1 \leq m \leq M. \qquad \text{EQUATION 15}$$

$\vec{\Delta}_m^{n,f}$ for each m is determined by collecting the values $\Delta_{i,m}^{n,mod\ 2}$ for all rays. The scaling according to the correlation coefficient and the projection into the hyper-planes (EQUATIONS 13-14) is commutative and can come in a different order.

Figure 4:
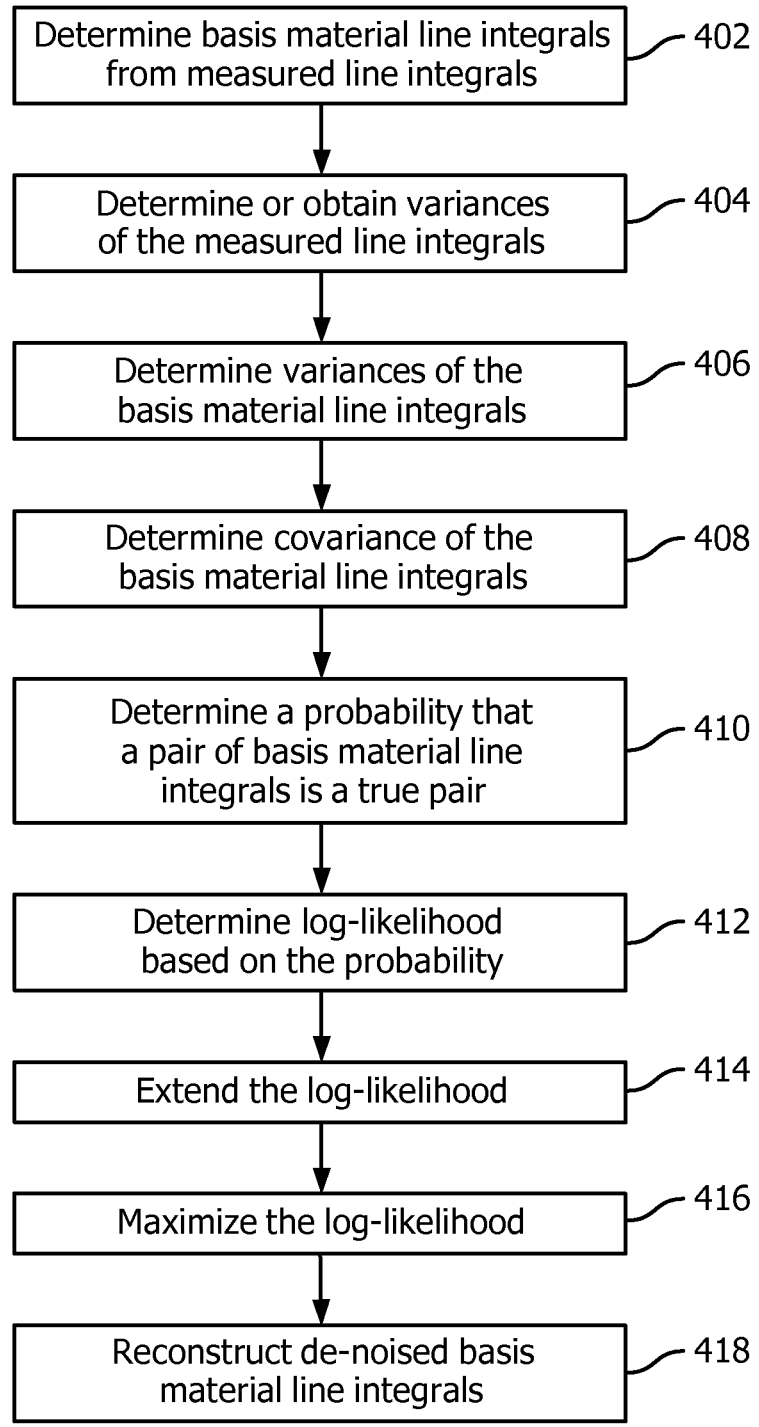
FIG. 4 illustrates an example method in accordance with the projection data processor of FIG. 2.

FIG. 4 illustrates a method in accordance with the projection data de-noiser 118 of FIG. 2.

At 402, measured line integrals are decomposed into individual sub-sets of basis material line integrals.

At 404, variances of the measured line integrals are determined or obtained.

At 406, variances of the material line integrals are determined based on the measured line integrals and the variances of the measured line integrals.

At 408, a covariance between the basis material line integrals is determined based on the measured line integrals, the basis material line integrals, and the variances of basis material line integrals.

At 410, a probability that a pair of decomposed (noisy) basis material line integrals are a "true" pair of basis material line integrals is determined based on the basis material line integrals, the variances of the basis material line integrals, and the covariance.

At 412, a log likelihood for a complete set of basis material line integrals is determined based on the probability.

At 414, optionally, the log likelihood is extended to include at least one regularization term representing a-priori information about the "true" set of material line integrals.

At 416, the log likelihood (or the extended log likelihood) is maximized, thereby filtering negatively correlated noise and producing de-noised decomposed projection data.

At 418, the de-noised decomposed projection data is reconstructed.

Figure 5:
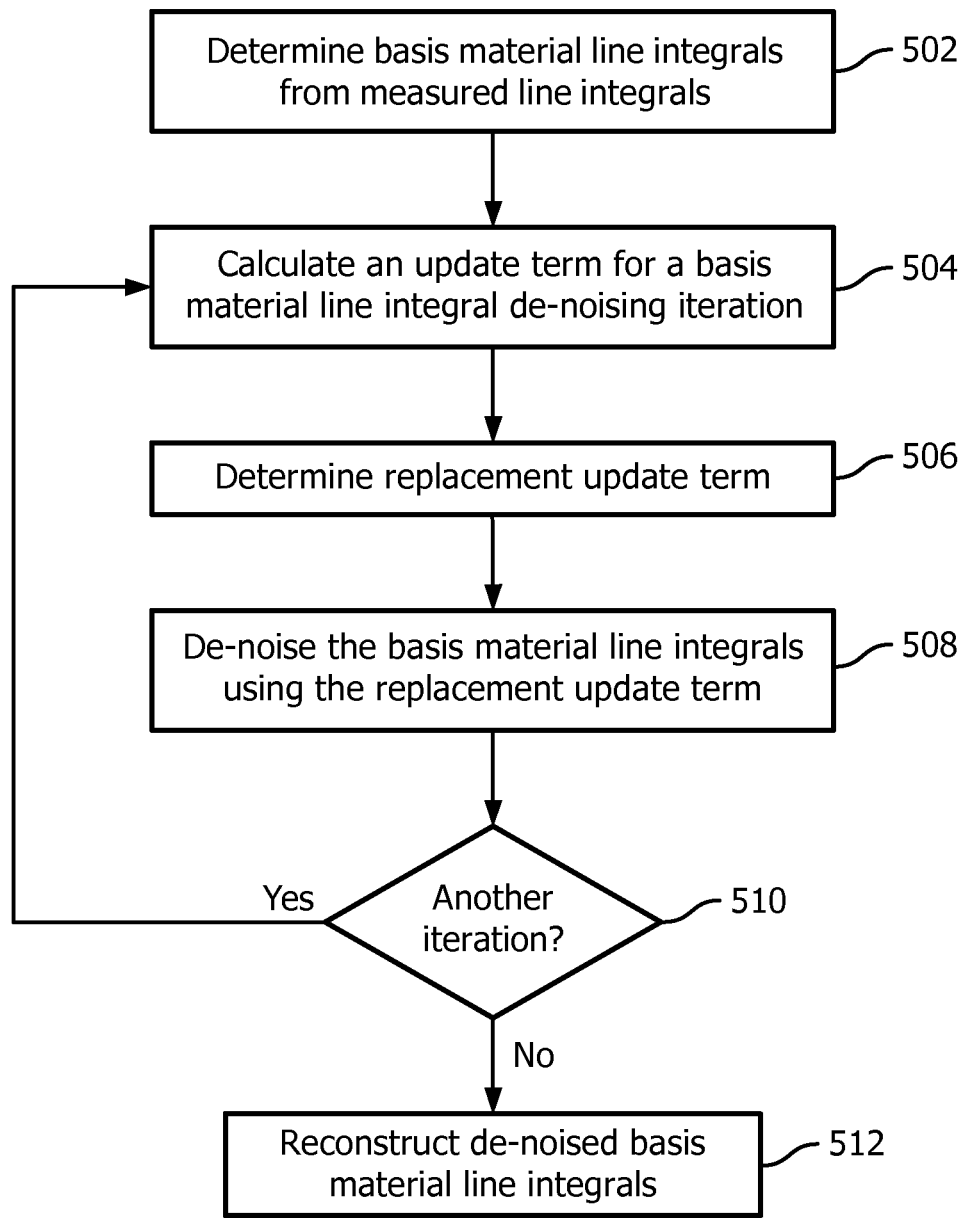
FIG. 5 illustrates an example method in accordance with the projection data processor of FIG. 3.

FIG. 5 illustrates a method in accordance with the projection data de-noiser 118 of FIG. 3.

At 502, measured line integrals are decomposed into individual sub-sets of basis material line integrals.

At 504, an update term for a basis material line integral de-noising iteration is calculated.

At 506, a replacement update term is generated, for example, based on a statistical correlation between a noise component of one of the basis material line integrals and noise components of all of the other basis material line integrals corresponding to the same ray and based on a correlated noise hyper plane.

At 508, the basis material line integrals are de-noised using the replacement update term.

At 510, if there is another de-noising iteration, acts 504-508 are repeated.

If there are no further de-noising iterations, then at 512, the de-noised basis material line integrals are reconstructed.

It is to be appreciated that the ordering of the acts in the method described herein is not limiting. As such, other orderings are contemplated herein. In addition, one or more acts may be omitted and/or one or more additional acts may be included.

The above methods may be implemented by way of computer readable instructions, encoded or embedded on computer readable storage medium, which, when executed by a computer processor(s), cause the processor(s) to carry out the described acts. Additionally, or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
   receiving spectral/multi-energy projection data, including at least two sub-sets of measured line integrals, each sub-set representing attenuation properties of a scanned object for different X-ray spectra;
   decomposing the spectral/multi-energy projection data into a plurality of basis material line integrals;
   determining a statistical model for the plurality of bases material line integrals, wherein the statistical model includes a regularization term for each of the plurality of basis material line integrals, and
   de-noising, solely in the projection domain, the plurality of basis material line integrals by removing correlated noise from the plurality of basis material line integrals according to the statistical model, generating de-noised decomposed basis material line integrals.

2. The method of claim 1, further comprising:
   reconstructing the de-noised decomposed basis material line integrals, thereby generating volumetric image data indicative of the scanned object.

3. The method of claim 1, wherein the statistical model leads to at least one of a log-likelihood function maximization or a cost function minimization.

4. The method of claim 1, wherein the regularization term includes at least one of a first parameter that evaluates, for each measured ray, a difference of the basis material line integral value to values of a number of neighboring rays; a second parameter that controls a smoothing effect of the statistical model, or a third parameter that weights the regularization based on an inverse of a distance between basis material line integrals.

5. The method of claim 1, further comprising:
   obtaining variances of the measured line integrals;
   determining variances of the basis material line integrals based on the measured line integrals and the variances of the measured line integrals; and
   determining a covariance between the basis material line integrals based on the measured line integrals, the basis material line integrals, and the variances of basis material line integrals.

6. The method of claim 1, further comprising:
   determining a covariance between the basis material line integral noise components of the same ray based on the noisy basis material line integrals within a vicinity of that ray.

7. The method of claim 4, further comprising:
   determining a probability that a pair of basis material line integrals are a "true" pair of basis material line integrals based on the basis material line integrals, the variances of the basis material line integrals, and the covariance; and
   determining the statistical model for the plurality of basis material line integrals based on the probability.

8. The method of claim 1, further comprising:
   performing a first de-noising iteration with an algorithm that includes a de-noising update term for the basis material line integrals, including:
   generating a replacement update term;
   replacing the update term with the replacement update term; and
   producing de-noised basis material line integrals based on the replacement update term.

9. The method of claim 8, further comprising:
generating the replacement update term based on multiple noise correlation coefficients and correlated noise hyper planes.

10. The method of claim 8, further comprising:
performing at least one subsequent de-noising iteration with an algorithm that includes a subsequent de-noising update term for the basis material line integrals, including:
   generating a subsequent replacement update term;
   replacing the subsequent update term with the subsequent replacement update term; and
   producing subsequent de-noised basis material line integrals iteration based on the subsequent replacement update term.

11. The method of claim 10, further comprising:
generating the subsequent replacement update term based on multiple noise correlation coefficients and correlated noise hyper planes.

12. The method of claim 11, further comprising:
determining the correlated noise hyper planes by calculating a predictor for the noise component of each of the basis material line integrals based on the noise components of all other basis material line integrals for the same ray.

13. The method of claim 12, wherein the predictor for each basis material line integral noise component is calculated based on an estimated covariance matrix between the basis material line integrals noise components of the same ray.

14. The method of claim 12, wherein the hyper-planes calculated by predicting the noise component of each different basis material line integral based on the noise components of the remaining basis material line integral noise components for the same ray are different from each other.

15. The method of claim 14, further comprising:
replacing the update term value for each basis material line integral by projecting the update term for all basis material line integral noise components of a ray on the hyper plane calculated for the given basis material line integral noise component and taking the coordinate of the projected update term corresponding to the given basis material line integral.

16. The method of claim 11, further comprising:
generating the multiple correlation coefficients as a function of a noise component of one of the basis material line integrals and noise components of the other basis material line integrals, corresponding to a same ray.

17. The method of claim 11, further comprising:
generating the multiple correlation coefficients based on the covariance matrix calculated for the noise components of the basis material line integrals of the same ray; and
calculating the multiple correlation coefficients between the noise component of each one of the basis material line integrals and between a predictor of the noise component of the same basis material line integral determined by the noise components assumed to be known of the noise components of all other basis material line integrals of the ray.

18. The method of claim 11, further comprising:
multiplying the update term value for each basis material line integral reading of a given ray obtained after projecting the original update term for this ray on the hyper-plane calculated for this basis material by the correlation coefficient calculated for the noise component of the same basis material for the ray.

19. A projection data processor, comprising:
a projection data de-noiser that receives at least a plurality of basis material line integrals corresponding to at least two different basis materials and that de-noises, solely in the projection domain, the plurality of basis material line integrals by removing correlated noise from the plurality of basis material line integrals according to a statistical model for the plurality of basis material line integrals, generating de-noised decomposed basis material line integrals, wherein the projection data de-noiser, comprises:
   a measured integral variance determiner that determines variances of measured spectral/multi-energy line integrals corresponding to the plurality of basis material line integrals;
   a basis material integral variance determiner that determines the variances of basis material line integrals;
   a basis material integral covariance determiner that determines covariances of basis material line integrals based on at least one of the variances of measured spectral/multi-energy line integrals or the basis material line integrals in the vicinity of a ray;
   a probability determiner that determines a probability that a pair of basis material line integrals belongs to a "true" pair of basis material line integrals;
   a log-likelihood determiner that determines, based on the probability, a log-likelihood for a complete set of basis material line integrals; and
   a correlation filter that performs correlation filtering of the basis material line integrals by maximizing the log-likelihood.

20. The projection data processor of claim 19, where the log-likelihood determiner generates an extended log-likelihood that includes the log-likelihood and at least one regulation term for each basis material, and the correlation filter performs the correlation filtering with the extended log-likelihood.

21. A projection data processor, comprising:
a projection data de-noiser that receives at least a plurality of basis material line integrals corresponding to at least two different basis materials and that de-noises, solely in the projection domain, the plurality of basis material line integrals by removing correlated noise from the plurality of basis material line integrals according to a statistical model for the plurality of basis material line integrals, generating de-noised decomposed basis material line integrals,
wherein the projection data de-noiser de-noises the plurality of basis material line integrals based on at least one of variances of the basis material line integrals and a covariance there between or multiple correlation coefficients and hyper-planes that describe the noise correlation between different basis material line integrals, and
wherein the projection data de-noiser comprises:
   an iterative de-noiser that de-noises the plurality of basis material line integrals using an algorithm that includes an update term;
   a replacement update determiner that determines a replacement update term for the de-noised plurality of basis material line integrals for each de-noising iteration, wherein the replacement update determiner determines the replacement update based on multiple correlation coefficients and hyper-planes; and a replacement update term replacer that replaces the update term with the replacement update term used in each of the de-noising iterations.

\* \* \* \* \*